R. D. MERSHON.
MEANS FOR CONTROLLING THE OPERATION OF ELECTROLYTIC CONDENSERS.
APPLICATION FILED MAY 26, 1917.

1,265,353.

Patented May 7, 1918.

R. D. Mershon
Inventor

By his Attorneys
Kerr, Page, Cooper & Hayward

UNITED STATES PATENT OFFICE.

RALPH D. MERSHON, OF NEW YORK, N. Y.

MEANS FOR CONTROLLING THE OPERATION OF ELECTROLYTIC CONDENSERS.

1,265,353.  Specification of Letters Patent.  Patented May 7, 1918.

Application filed May 26, 1917. Serial No. 171,206.

*To all whom it may concern:*

Be it known that I, RALPH D. MERSHON, a citizen of the United States, residing at New York, in the county and State of New York, have invented certain new and useful Improvements in Means for Controlling the Operation of Electrolytic Condensers, of which the following is a full, clear, and exact description.

This invention relates to the operation of electrolytic condensers, and its chief object, briefly stated, is to provide a system in which it is impossible to connect the condenser terminals to the alternating current circuit in which the condenser is to be used, until the condenser has been suitably charged by means of direct current. Another object is to provide automatic means for opening the alternating current circuit to the condenser (a) whenever the unidirectional charging current falls to a value insufficient to keep the condenser properly charged; (b) whenever the alternating current voltage falls to a predetermined minimum value; and (c) whenever the alternating current impressed on the condenser rises to a predetermined excessive value. To these and other ends the invention consists in the novel features and combinations hereinafter described.

Figure 1:
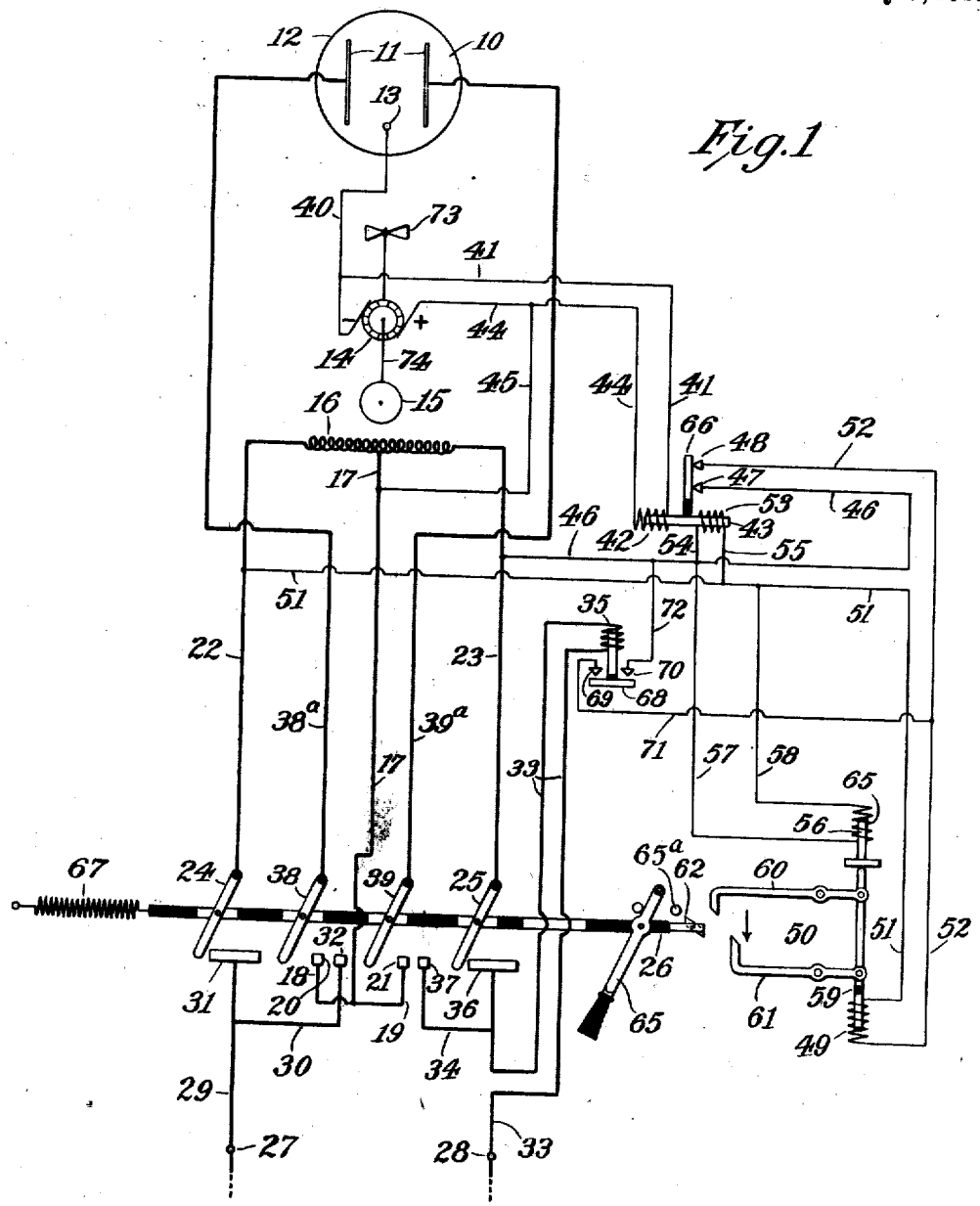
Figure 2:
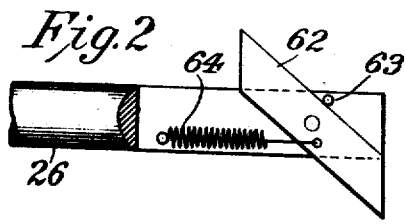

One embodiment of the invention is illustrated diagrammatically in the annexed drawing, in which Figure 1 shows the complete system and Fig. 2 illustrates a detail of the controller.

10 designates an electrolytic condenser (shown in plan) consisting of a pair of electrodes 11 coated with the usual dielectric films and immersed in a suitable electrolyte in the vessel 12. The electrode 13 is of carbon or any other suitable material which does not take on a film of the kind indicated, and is provided for the purpose of leading charging current out of the condenser. The charging current, which is unidirectional, is provided by a D. C. generator 14, driven by an A. C. motor 15, the two constituting a motor-generator set. The motor may be of any convenient type and may be provided with starting means (not shown) if necessary or desirable. The primary of the A. C. motor is indicated at 16, and in the present embodiment of the invention is conveniently utilized as a transformer, its middle or neutral point being connected by wires 17, 18, 19 to the two contacts 20, 21, while its terminals are connected by wires 22, 23, to the arms 24, 25, of the controller and circuit-breaker 26. The A. C. circuit in which the condenser is to be used is indicated by the terminals 27, 28, the first of which is connected by wires 29, 30, to the controller contacts 31, 32, while the second is connected by wires 33 and 34 through an over-load-release relay 35, to the controller contacts 36, 37. The condenser electrodes are connected to the controller arms 38, 39, by wires 38ª, 39ª.

One terminal of the D. C. generator 14 is connected by wire 40 to the non-filming condenser-charging electrode 13. From wire 40 a tap 41 is brought out to winding 42 of the D. C.—A. C., relay 43, which winding is connected by wire 44 to the other terminal of the D. C. generator. The latter terminal is also connected, by wire 45, to wire 17, which, as stated above, is connected to the neutral point of the field 18 of the A. C. motor 15.

From wire 23 a tap 46 is brought out to contact 47 of the relay 43, while wire 22 is connected to the other contact, 48, through the lower winding 49 of the interlocking device 50, by wires 51, 52. The winding 49 is thus bridged across the terminals of the auto-transformer (and motor-primary) 16 through the contacts 47, 48 of the D. C.—A. C. relay 43. The A. C. winding, 53, of this relay, is also bridged across the transformer terminals, being connected to wires 46—51 by wires 54, 55. Similarly the winding 65 of the no-voltage release 56 is bridged across the transformer terminals, being connected to the wires 46—51 by the wires 57—58.

The armature 59 of the solenoid 49 is pivotally connected to two escapement levers 60, 61, which are fulcrumed at the right of the center of gravity of the system so that the tendency of the levers is to swing by gravity in the direction of the arrow. The pointed ends of the levers coöperate with a dog 62, pivoted in a slot in the end of the controller or circuit-breaker link 26, which dog is normally held against a stop 63, Fig. 2, by a light spring 64.

The armature 65 of the solenoid 56 is not attached to the extension of armature 59, but merely rests on top of the same.

The controller is shown in its initial position in Fig. 1. When it is shifted one step to the right by the lever or handle 65 the arms 24 and 25 are brought over upon contacts 31, 36, but arms 38, 39 are still out of engagement with contacts 20, 21. Alternating current now flows through wires 22, 23, and primary 16, and the A. C. motor starts. This starts the generator 14, which sends direct current through wire 44, winding 42 of relay 43, and wire 41 back to the generator; and at the same time alternating current flows from the leads 22, 23, through wires 46, 51, and 54, 55, to the winding 53. As long as the alternating current is sufficient to hold the armature 66 on contacts 47, 48, against the pull of the D. C. winding 42, the solenoid 49 is energized and armature 59 is held down, thereby holding the point of lever 61 in the path of the lower end of dog 62.

The controller is now shifted another step, thereby bringing arms 38, 39 upon contacts 20, 21, but leaving arms 24, 25 still on contacts 31, 36. Unidirectional current from generator 14 now flows through wires 44, 45, 17, 18 and 19, contacts 20, 21, controller arms 38, 39 and wires 38ª, 39ª, to electrodes 11, thence through the electrolyte to the charging or non-filming electrode 13 and through wire 40 to the negative side of the generator, thus charging the condenser. When the direct current through the winding 42 of relay 43 reaches a certain predetermined ratio to the alternating current through winding 53 (at which point the condenser is fully charged) the armature of the relay is drawn to the left, thereby opening contacts 47, 48, and deënergizing solenoid 49, thus permitting the levers 60, 61 to fall, thereby carrying the point of lever 61 below the path of the dog 62. The controller can now be shifted to its fourth position, the upper end of dog 62 being cammed down as it passes the point of lever 60 and immediately snapping up behind the same, thus holding the controller in its final position. In this position the arms 24, 25 are still on contacts 31, 36, but arms 38, 39 have been carried to contact 32, 37. Alternating current from the terminals 27, 28 is now impressed upon the condenser electrodes through leads 38ª, 39ª, and also upon the A. C. motor primary through wires 22, 23, as before. At the same time, direct current from the generator 14 flows through wires 44, 45 and 17 to the neutral point of primary 16, thence through leads 22, 23, controller arms 24, 25, contacts 31, 36, leads 30, 34, contacts 32, 37, and leads 38ª, 39ª, to the electrodes 11, thereby keeping the condenser charged.

Suppose, now, that for any reason the direct current from the generator 14 becomes insufficient to keep up the static charge on the condenser electrodes. This means that the pull of the D. C. winding 42 of relay 43 is less than the pull of the A. C. winding 53. Hence the armature 66 is drawn to the right, closing contacts 47, 48, and reënergizing solenoid 49. The levers 60, 61 are thus swung up, carrying the point of the former out from behind dog 62, and allowing the spring 67 to retract the controller to its initial position, thereby throwing all current off the system.

On the other hand, assuming the controller to be still in its fourth position, suppose that the A. C. voltage should fall to zero or other predetermined value. In that case solenoid 56, normally energized by current from leads 22, 23, through wires 46, 51, 57, 58, would allow its armature 65 to fall, thereby depressing armature 59 and swinging the points of locking levers 60, 61, upward. Dog 62 is thus freed from the former lever and spring 67 retracts the controller to initial position.

Or, suppose that an excessive voltage is impressed upon the system or for any other cause an excessive current flows through the condenser. In that case the over-load relay 35, connected in series with terminal 28 by wire 33, is energized, and draws up its armature 68, thus bridging the contacts 68, 70. This connects the wires 71, 72 across contacts 47, 48. Solenoid 49 is thereby energized by current from lead 23, wires 46, 72, armature 68, wires 71 and 72, winding 49, and wire 51 to lead 22. Armature 59 is thus drawn down, releasing the dog 62 and permitting the spring 67 to retract the controller to the initial position.

When the system is in normal operation the controller is locked in its fourth position, as explained above, and cannot be retracted directly to initial position by hand. Nor can it be moved farther toward the right because of the stop 65ª. But by depressing armature 59 manually (by any suitable means, not shown) the point of lever 60 is raised, thereby unlocking the controller as already described, whereupon the controller can be carried back to initial position by the spring 67.

From the foregoing it will be seen (1) that it is impossible to impress alternating current upon the condenser until the latter is charged; (2) that the charge is maintained by direct current from a generator driven by a motor which receives its current from the A. C. source; (3) that if the unidirectional current should fall to a value insufficient to maintain the charge on the condenser the alternating current circuit to the condenser is automatically broken; (4) that if the alternating current on the condenser rises to an excessive value the A. C. circuit is automatically broken; and (5) that if the A. C. voltage falls to a predetermined minimum,—for example zero, as when current is cut off from the induction motor or other apparatus with which the condenser is used,—the circuit to the condenser is broken.

If desired, a fan 73 may be provided, driven from the motor-generator set, for example by mounting it directly upon the shaft 74 thereof, to blow air upon the condenser to cool the latter.

It is to be understood that the invention is not limited to the form herein specifically illustrated and described, but can be embodied in other forms without departure from its spirit as defined by the appended claims.

I claim:—

1. The combination with an electrolytic condenser, and means for connecting the condenser with an alternating current circuit, of means for impressing unidirectional charging current upon the condenser, and automatic means preventing actuation of the first-named means to connect the condenser to the alternating current circuit until the condenser is charged by the unidirectional current.

2. The combination with an electrolytic condenser, and means operable to connect the condenser with an alternating current circuit, of a source of direct current for charging the condenser, mechanism coöperating with said means to prevent actuation thereof, and automatic means, dependent for operation upon a predetermined value of the charging current, for rendering said mechanism inoperative to prevent actuation of the first-named means.

3. The combination with an electrolytic condenser, and a controller for connecting the condenser with an alternating current circuit, of a member initially positioned to prevent actuation of the controller to connect the condenser to the alternating current circuit, means for supplying charging current to the condenser to charge the same, and means, operable automatically when the condenser is charged by said charging current, to shift said member and thereby permit actuation of the controller.

4. The combination with an electrolytic condenser, and means for connecting the same with an alternating current circuit, of means for delivering unidirectional charging current to the condenser to charge the same, and means for breaking connection between the condenser and the alternating current circuit whenever the unidirectional charging current falls to a predetermined minimum.

5. The combination with an electrolytic condenser, and shiftable means for connecting the same with an alternating current circuit, of means for delivering unidirectional charging current to the condenser to keep the same charged, mechanism for locking the first-named means with the condenser connected to the alternating current circuit, and automatic means for unlocking the first named means to permit disconnection of the condenser from the alternating current circuit whenever the aforesaid charging current falls to a predetermined minimum.

6. The combination with an electrolytic condenser, and means shiftable at will to connect the condenser with an alternating current circuit and automatically shiftable to disconnect the condenser from said circuit of means for delivering unidirectional charging current to the condenser to charge the same, mechanism for locking shiftable means with the condenser connected to the alternating current circuit, and means operating to unlock the shiftable means whenever the aforesaid charging current falls to a predetermined value and thereby permitting the shiftable means to be shifted automatically to disconnect the condenser from the alternating current circuit.

7. The combination with an electrolytic condenser, and means for connecting the same with an alternating current circuit, of means for delivering unidirectional charging current to the condenser to charge the same, and electromagnetic means operating both to prevent connection of the condenser to the alternating current circuit until the aforesaid charging current reaches a predetermined value and to cause disconnection of the condenser from said circuit whenever the aforesaid charging current falls to a predetermined value.

8. The combination with an electrolytic condenser, and a member shiftable at will to connect the condenser to an alternating current circuit and shiftable automatically to disconnect the condenser from said circuit, of means for supplying unidirectional charging current to the condenser to charge the same, mechanism normally preventing shifting of said member to connect the condenser to the said circuit and normally preventing shifting of said member to disconnect the condenser from said circuit after connection with the latter has been made, means operable when the aforesaid charging current reaches a predetermined value to actuate said mechanism and thereby permit shifting of said member to connect the condenser with said circuit, and means operable whenever said charging current falls to a predetermined value to actuate said mechanism and thereby permit automatic shifting of said member to disconnect the condenser from said circuit.

9. The combination with an electrolytic condenser, and a member shiftable at will to connect the condenser with an alternating current circuit and shiftable automatically to disconnect the condenser from said circuit, of means for supplying unidirectional charging current to the condenser to charge the same, mechanism normally preventing shifting of the said member to connect the condenser to said circuit and normally preventing automatic shifting of said member to disconnect the condenser from the circuit; electromagnetic means, operating when the charging current reaches a predetermined value, to actuate said mechanism and thereby permit shifting of the said member to connect the condenser with the alternating current circuit, and operating, whenever the charging current falls to a predetermined value, to actuate said mechanism and thereby permit automatic shifting of the said member to disconnect the condenser from said circuit; electromagnetic means for actuating said mechanism to permit automatic shifting of said member, whenever the voltage in the alternating current circuit falls to a predetermined value, and electromagnetic means for actuating said mechanism to permit automatic shifting of said member whenever the voltage in said circuit becomes excessive.

10. The combination with a system including an alternating current circuit and an electrolytic condenser connected therewith; of means for supplying unidirectional charging current to the condenser to charge the same; an automatic circuit-breaker for breaking the connection between the condenser and the alternating current circuit; a locking device normally preventing operation of the circuit-breaker; means to shift the locking device and permit operation of the circuit-breaker, whenever the aforesaid charging current falls to a predetermined value; means to shift the locking device and permit operation of the circuit-breaker, whenever the voltage in the alternating current circuit becomes excessive; and means to shift the locking device and permit operation of the circuit-breaker, whenever the voltage in the said circuit falls to a predetermined value.

In testimony whereof I hereunto affix my signature.

RALPH D. MERSHON.